UNITED STATES PATENT OFFICE.

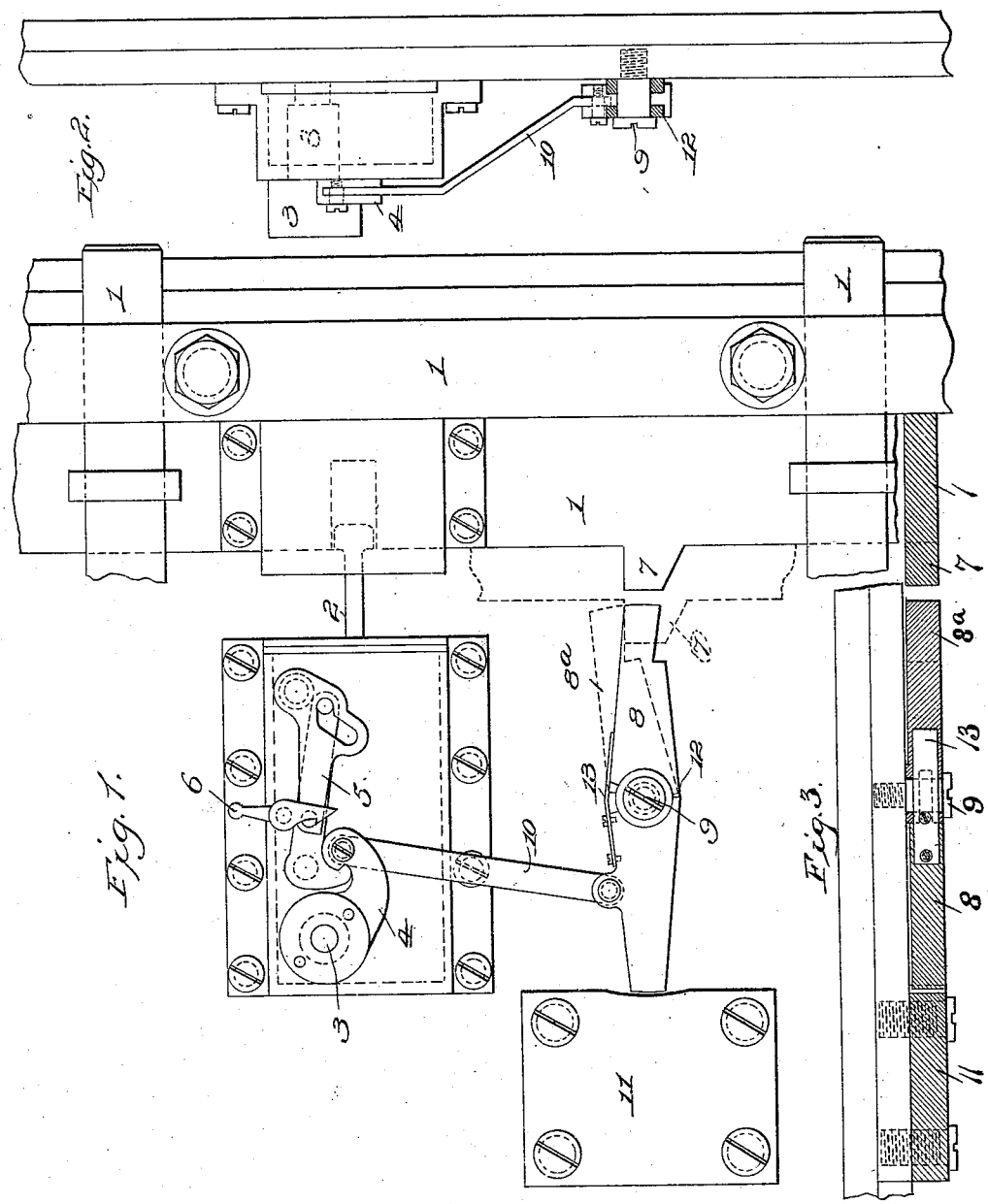

EMORY STOCKWELL, OF STAMFORD, CONNECTICUT, ASSIGNOR TO THE YALE & TOWNE MANUFACTURING COMPANY, OF SAME PLACE.

AUTOMATIC BOLT-DOGGING DEVICE.

SPECIFICATION forming part of Letters Patent No. 551,697, dated December 17, 1895.

Application filed December 26, 1894. Serial No. 532,998. (No model.)

*To all whom it may concern:*

Be it known that I, EMORY STOCKWELL, a citizen of the United States, residing at Stamford, in the county of Fairfield and State of Connecticut, have invented certain new and useful Improvements in Automatic Bolt-Dogging Devices, of which the following is a specification.

The invention has for its object to provide means for directly dogging the boltwork in a safe, which means is under the control of the automatic bolt-operating mechanism.

A further object is to provide for setting the dog by the act of setting up the automatic mechanism, while the bolts are withdrawn, and to so construct said dog that it will thereafter enter into the locked position automatically when the bolts are cast.

Automatic bolt-operating devices have been objected to on the ground that when the bolts are cast they are not deadlocked, and this has been alleged as a source of insecurity. It has been sought to overcome this alleged insecurity by the use of a dog under control of the time-lock, which, so long as the time-lock is in locked position, will deadlock the boltwork. This device is effective, but it may cause considerable trouble, owing to the fact that sometimes the hook which holds up the combination-lever system of the automatic bolt-operating mechanism may be engaged so insecurely, owing perhaps to the movements not being wound or to something which causes the hook to stick, that the jar caused by the boltwork being thrown forward will throw off the hook and thus permit the unlocking-springs to come into operation, in which case, the time-lock being in locked position, the boltwork is thrown against the time-lock dog with all the force of the unlocking-springs and there is no possible way to get the bolts forward or back, so that an absolute lockout occurs, necessitating cutting open the safe. For the above reason it is obvious that such proposed device is dangerous when a time-lock is used in connection with an automatic and the boltwork is dogged by means of the time-lock.

My present invention provides a dog which will directly and absolutely lock the boltwork, but it is not liable to cause any trouble from lockout.

It consists principally in an independent movable bolt or dog which is connected to some part of the lever system of an automatic locking and unlocking device and arranged to be shifted into effective position by the act of setting up the automatic. I have shown the dog movable upon a pivot and connected to the hook upon the main shaft by which the system is set up, so that when this shaft is turned by means of the wrench the dog is rocked into locking position.

The invention further consists in so constructing the locking-dog that it may be thus drawn into locking position while the bolts are withdrawn and therefore while the front end remains out of active position, but will immediately enter behind the boltwork as soon as the latter is cast. I accomplish this by making one end of the dog yielding, so that when the opposite end is pulled up the yielding end may rest upon that position of the boltwork which it is to engage, and may be forced into position behind said boltwork when the latter is cast.

The invention also consists in certain other details of construction whereby the parts are better adapted to perform the functions above referred to.

My invention will be fully understood upon reference to the accompanying drawings, in which—

Figure 1 represents a portion of the boltwork together with the well-known form of automatic bolt-operating device and my present improvements associated with said parts. Fig. 2 is an edge view of the automatic and a sectional view of the dog through the joint which renders it yielding. Fig. 3 is a horizontal section through the dogging-lever and the parts in a plane therewith.

1 may represent any suitable form of boltwork and 2 the draw-bar of the automatic unlocking device which is set up into operative position by means of the main shaft 3 carrying the hook-lever 4 and controlled by compound levers 5 which are in turn sustained by the detent 6 controlled by a time-lock. For convenience the dogging of the boltwork is effected through the medium of a projection 7. This is engaged by the dog 8 pivoted at 9 and connected by link 10 with some portion of the automatic—such, for instance, as hooked lever 4 of the main shaft 3. In the case of a double automatic there may be two links connecting the two hook-levers of the automatic to the dog. In this case the rear portion of the dog, if the yielding device is placed in the center, as in the construction shown in Fig. 1, will need to be made double. From the construction it is obvious that when the shaft 3 is turned by the usual wrench until the hooked lever 4 is moved up into engagement with compound levers 5 the dog 8 will be rocked into the position shown in front of the projection 7, when it will be impossible to force back the bolts from the outside.

11 represents an abutment for the dog 8 in the event of its being unseated from its pivot 9. It is desirable, however, and, with the form of automatic shown, necessary to set the dog before the bolts have been cast. For this reason dog 8 is provided with a joint 12 which permits it to bend upward slightly, and with a spring 13 attached to one part and bearing on the other, to hold said parts normally in alignment. By this construction it will be seen that when the bolts are withdrawn and the projection 7 therefor in the position shown by dotted lines, the dog 8 may still be set by movement of the shaft 3 and hooked lever 4, inasmuch as the spring yields when the front end 8ª is obstructed by the projection 7. When however the bolts are cast and projection 7 moves out from beneath the end 8ª the latter is returned to locked position by the spring 13 and the dogging is effected as desired.

It is obvious that the yielding device may be placed in any desirable relation to the dog—as, for instance, under the rear end of it—so as to tend to throw the lower end up. In this case the lower end of the link would not be rigidly connected to the dog, but merely pressing upon its upper surface.

While I have shown the particular construction and arrangement of parts above described, I desire it understood that many changes may be made without departing from the spirit of my invention, which consists broadly in providing a movable dog for the boltwork, which dog is moved out of the way by the automatic unlocking device, and is permitted or caused to enter into effective position automatically upon casting the bolt.

Having thus described my invention, the following is what I claim as new therein and desire to secure by Letters Patent:

1. In combination with the bolt-work of a safe and an automatic unlocking device, the dog movable into and out of the path of the bolt-work and controlled by said unlocking device, substantially in the manner explained.

2. In combination with the bolt-work of a safe and an automatic device for retracting the same, the dog movable into and out of the path of the bolt-work and adapted to be held out of effective position thereby, connection between said dog and the bolt-retracting device, for withdrawing the former from in front of the bolt-work, and means for forcing the dog into effective position when the bolt-work moves from beneath it, substantially as set forth.

3. In combination with the bolt-work of a safe and an automatic bolt retracting device; the dog movable into and out of position in front of the bolt-work, and a positive connection between said dog and the automatic retracting device, whereby it is moved in both directions as explained.

4. In combination with the bolt-work of a safe and the automatic bolt retracting power, the setting shaft and a retaining lever carried by said shaft; the pivoted dog for dogging the bolt-work and a link connecting said dog with said retaining hooked lever of the bolt retracting device, substantially in the manner and for the purpose set forth.

5. In combination with an automatic bolt operating device of substantially the character specified, an independent dog, arranged to dog the bolt-work, connection between said dog and the lever system of the automatic bolt-operating device and a yielding device which permits the dog to remain in the unlocked position while the automatic bolt operating device is set in the position for locking.

6. In combination with the bolt work of a safe, a dogging lever under control of the locking mechanism thereof and arranged to move into the path of the bolt work, and having a spring joint therein which permits it to break or bend, substantially as and for the purposes set forth.

EMORY STOCKWELL.

Witnesses:
SCHUYLER MERRITT,
GEO. E. WHITE.